(No Model.)  2 Sheets—Sheet 1.

T. KIRKWOOD.
FURNACE GRATE.

No. 299,146. Patented May 27, 1884.

WITNESSES:  INVENTOR
  Thomas Kirkwood
  BY Wm H Lotz
  ATTORNEY (No Model.) 2 Sheets—Sheet 2.

T. KIRKWOOD.
FURNACE GRATE.

No. 299,146. Patented May 27, 1884.

WITNESSES:
Adam Geo. White.
M. D. Clagett

INVENTOR
Thomas Kirkwood
BY Wm H Lotz
ATTORNEY

N. PETERS, Photo-Lithographer, Washington, D. C.

UNITED STATES PATENT OFFICE.

THOMAS KIRKWOOD, OF CHICAGO, ILLINOIS.

FURNACE-GRATE.

SPECIFICATION forming part of Letters Patent No. 299,146, dated May 27, 1884.

Application filed September 14, 1883. (No model.)

*To all whom it may concern:*

Be it known that I, THOMAS KIRKWOOD, a citizen of the United States of America, residing at Chicago, in the county of Cook and State of Illinois, have invented certain new and useful Improvements in Grates for Furnaces, of which the following is a specification, reference being had therein to the accompanying drawings.

This invention relates to an improvement in the class known as "shaking-grates;" and it consists of the novel devices and combination of devices hereinafter described and claimed.

Figure 1:
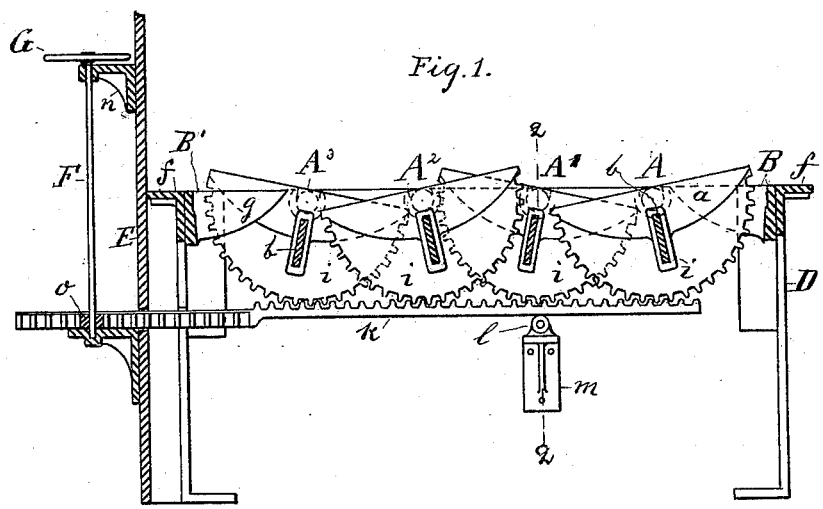
Figure 2:
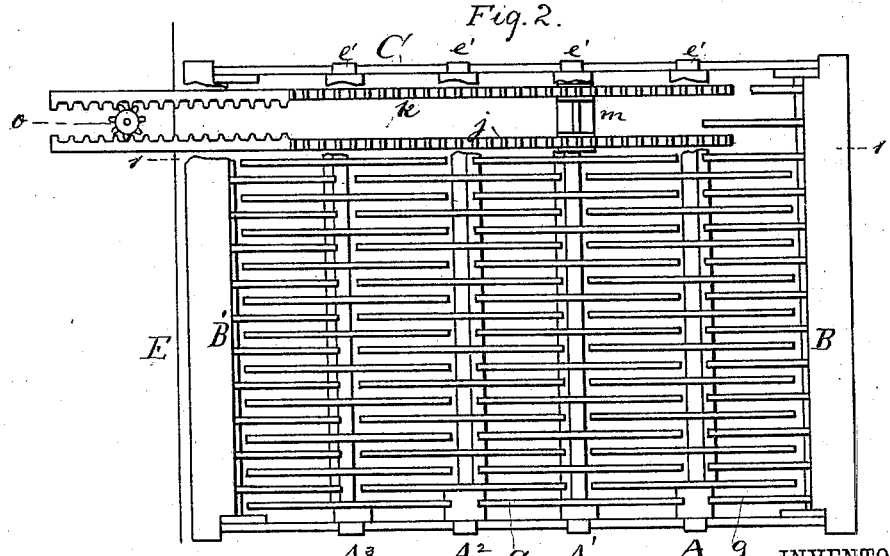
Figure 3:
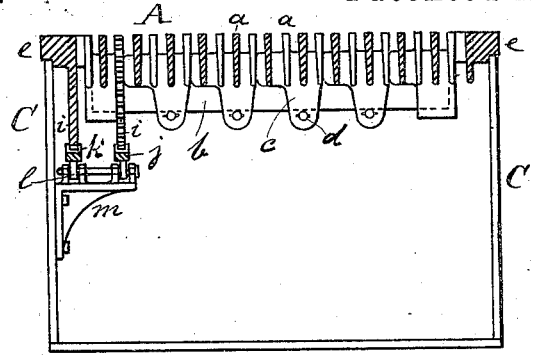
Figure 4:
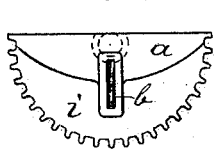
Figure 5:
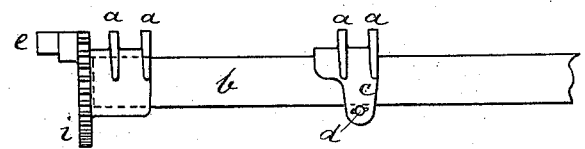
Figure 6:
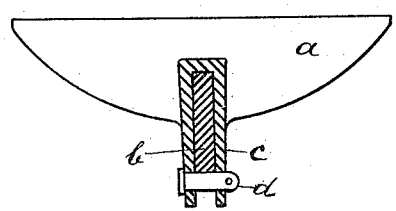
Figure 7:
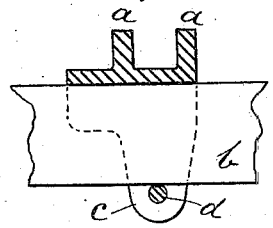

In the accompanying drawings, Figure 1 represents a sectional view on line 1 1 of Fig. 2, which is a plan of the grate; Fig. 3, a section on line 2 2 of Fig. 1; and Figs. 4, 5, 6, and 7, views in detail.

Like letters refer to like parts in each view.

The grate is composed of a series (two or more) of shaking-sections, A A' A² A³, and of two stationary end sections, B B'. The shaking-sections consist each of a series of semi-circular plates, $a$, arranged parallel at equal distances apart, and removably secured to a longitudinal bar, $b$, as will be described. These plates $a$ form the grate-bars proper, and are placed with their straight edges upward in line with each other. As above mentioned, these plates are removably secured to bars $b$, and in the following manner: Each plate is provided with a downwardly-projecting portion, $c$, (or two or more plates may be cast together,) and is cored out, as is clearly shown in Fig. 6, and, as shown in that figure, is fitted over the bar $b$, and held in place by a pin, $d$, which passes through the part $c$ at a point immediately below said bar. By having these plates thus removably secured to the bars $b$, I am enabled, when one is broken or burned away, to replace it with a new one without the trouble or expense of removing and renewing the entire bar. The ends of bars $b$ of each section are inserted into sockets $e$, situated upon the side bars, C, these sockets to be hereinafter referred to. The plates $a$ of each section are relatively spaced to alternate and interlap the plate of the next adjacent section, and that the plates of one section will extend centrally into the interstices between the plates of such adjacent section, and will reach to near the axial line of the same in a manner that the ends of plates of alternate sections will nearly meet, and apparently will form continuous grate-bars. The end sections, B B', consist each of an L-plate, $f$, that has cast to one side a series of quarter-circular plates, $g$, which alternate and interlap the plates $a$ of the next adjacent section, A or A³. The L-plates $f$ of sections B B' are secured upon standard-frames D, on which the entire grate is supported, such standard-frames having end flanges, $h$, for securing by bolts the bars C, which form the longitudinal connection for such frame. Each socket $e$, before referred to, is formed with a trunnion, $e'$, which fits into the notches in bars C, and such of said sockets as are situated upon one side of the furnace are cast with toothed segments $i$, so arranged that the segments of alternate sockets will be in the same line, the teeth of the segments of the sockets in which sections A A² are supported meshing with teeth formed on the upper face of a rack, $j$, while those of sections A' and A³ mesh with teeth similarly formed on a rack, $k$. These racks $j$ and $k$ are each mounted on rollers $l$, which are secured to a suitable pivot-bar mounted in a bracket, $m$, secured to side C, and said racks protrude out a certain distance through the front wall, E, of the furnace.

By reference to Fig. 2 it will be seen that the teeth described as formed on the upper face of racks $j$ $k$ extend only a portion of the length of said racks, and, further, that from the point where these teeth stop to the outer end of the racks they have teeth formed on their inner faces, said teeth being opposite each other. A vertical shaft, F, has bearings in suitable brackets, $n$, secured to the front wall of the furnace, and is provided at its upper end with a hand-wheel, G, and at its lower end with a pinion, $o$, said pinion meshing with the teeth described as formed on the inner faces of racks $j$ $k$.

By the arrangement of parts as above described, it will be seen that upon turning the hand-wheel G motion is imparted, through shaft F, pinion $o$, and racks $j$ $k$, to the toothed segments $i$, and through them to the bars $b$ and plates $a$; and as the segments are arranged alternately with respect to racks $j$ $k$, and as such racks move in opposite directions, the plates *a* of adjacent sections will be moved in opposite directions; and, further, it will be understood that by turning the hand-wheel sufficiently the plates may be brought to a vertical position to empty the fire entirely therefrom.

What I claim is—

The plates *a*, provided with downwardly-projecting lugs *c*, and adapted to fit over bars *b*, in combination with said bars, means for holding them in position, and means for shaking such bars and plates, as and for the purpose set forth.

In testimony whereof I affix my signature in presence of two witnesses.

THOMAS KIRKWOOD.

Witnesses:
M. J. CLAGETT,
ADAM GEO. WHITE.